March 20, 1951 A. D. SCOTT 2,545,675
FASHION PREVIEWING PROJECTION APPARATUS
Filed Oct. 22, 1949 2 Sheets-Sheet 1
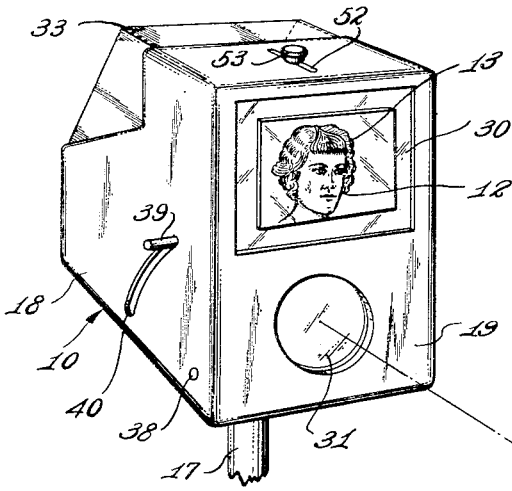
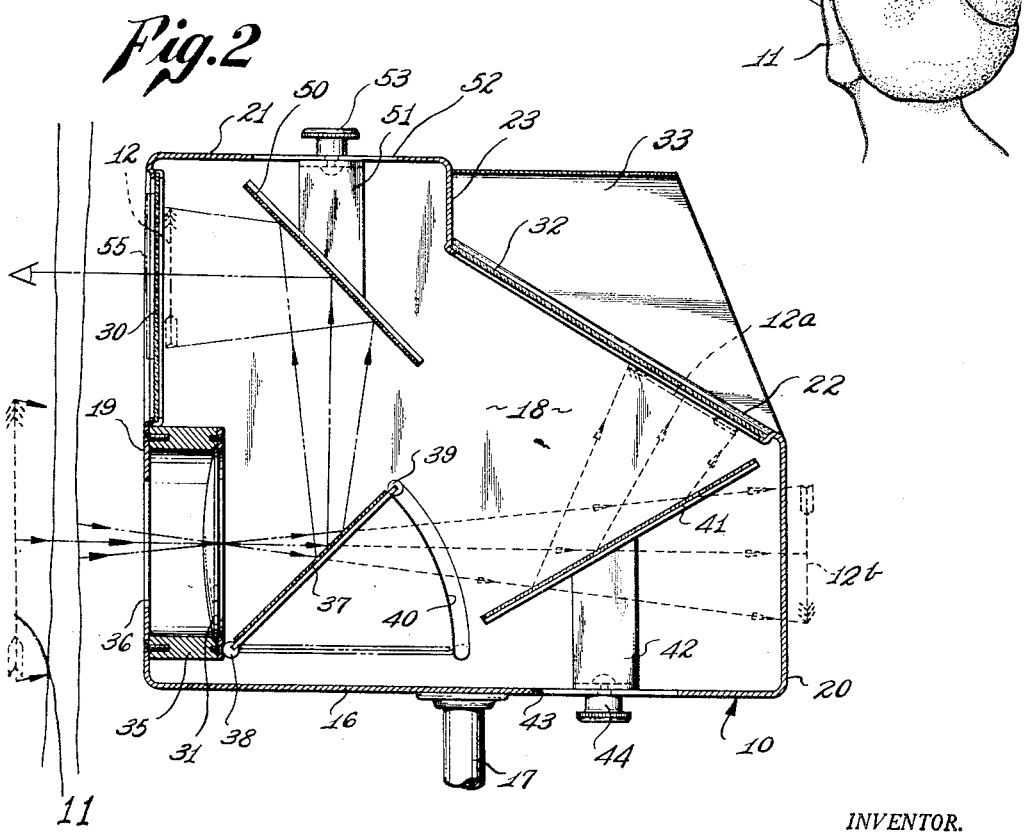
INVENTOR.
ARTHUR D. SCOTT
BY
Attorney March 20, 1951  A. D. SCOTT  2,545,675
FASHION PREVIEWING PROJECTION APPARATUS
Filed Oct. 22, 1949  2 Sheets-Sheet 2

INVENTOR.
ARTHUR D. SCOTT
BY
Attorney

Patented Mar. 20, 1951

2,545,675

UNITED STATES PATENT OFFICE 2,545,675

FASHION PREVIEWING PROJECTION APPARATUS

Arthur D. Scott, Pacific Palisades, Calif., assignor to Magic Mirror Beauty Salons, Inc., Los Angeles, Calif.

Application October 22, 1949, Serial No. 122,981

9 Claims. (Cl. 88—24)

My invention relates generally to fashion previewing, and more particularly, to apparatus for viewing the effect of various coiffures and custom-made clothing on the appearance of a particular person, so as to aid his or her selection before the individualized work is authorized.

A particular application in which my invention is especially advantageous is in the art of creating individual hair styles or coiffures, wherein as can be readily understood, choice and taste are paramount factors in producing a successful and pleasing result. Other uses are also apparent, as in the creating of custom millinery, where it may be desirable to show the appearance of a hat relative to the facial features of the purchaser before the article has been made.

It is therefore a major object of my invention to provide a viewing instrument whereby a subject image is combined with a pictorial representation of a coiffure or clothing to produce a view or picture of the subject as he or she would appear dressed in such fashion.

Another object of my invention is to provide a viewing instrument whereby the salesperson or hairdresser can select those fashions which he thinks most appropriate and test them relative to the subject before showing the combined image to the subject.

A further object of my invention is to provide a viewing instrument which produces a photograph of such combined images should the patron desire a permanent record.

Yet another object of my invention is to provide a viewing instrument which may be easily adjusted to properly align and focus the subject image in the field of view.

Still another object of my invention is to provide a relatively inexpensive viewing instrument of rugged and simple construction.

These and other objects and advantages of my invention will become apparent from the following detailed description of my preferred and modified apparatus, and from an inspection of the accompanying drawings in which:

Figure 1 is a perspective view of a preferred form of my apparatus showing a subject viewing her resulting image on the device;

Figure 2 is a vertical cross-section of the preferred form of my apparatus taken along the longitudinal center line thereof;

Figure 3:
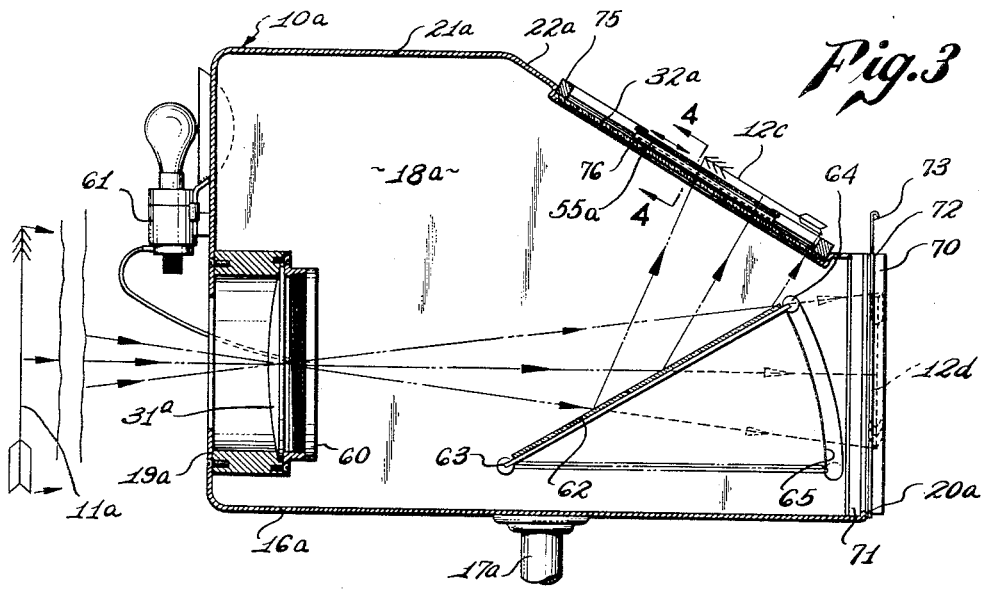
Figure 3 is a vertical cross-section of a modified form of my apparatus taken along the longitudinal center line thereof.

In describing my apparatus, I have hereinafter illustrated a specific embodiment that is especially useful in the art of creating coiffures. I wish it to be understood, however, that considerable modification can be made without departing from the scope of my invention. By changes such as in the size and shape of the apparatus, my invention can be used in many other arts of a related nature.

Referring now to the drawings and particularly to Figure 1 thereof, the numeral 10 indicates generally the housing in which my apparatus is contained. A person or subject 11 is positioned in front of the housing 10 and a reduced image 12 of her face appears on the front of the housing. The image 12 is modified by the addition of a particular coiffure 13 which is represented on a transparent plate or slide superimposed on the image and properly aligned with her facial outline. The subject 11, therefore, views a simulated image which represents her appearance upon the creation of the particular coiffure 13. In order to prevent interference and overlapping of the actual hair of the subject 11 with the coiffure 13, she may be provided with a net or mask 14 which fits tightly around her head and binds her hair inwardly. As can also be understood, many different representations of coiffures 13 are supplied for use with the apparatus, thereby allowing the subject 11 a large selection from which to choose the most appropriate.

The housing 10 in which my apparatus is contained is a generally rectangular box-like structure having a horizontal base 16 supported on a suitable stand or pedestal 17 as is best seen in Figure 2. The pedestal 17 is adjustable vertically and positions the housing 10 at a height above the floor corresponding to the height of the particular subject 11 who is comfortably seated during the operation. The housing 10 may then be brought into proper alignment with any subject 11.

Extending upwardly from the base 16 are vertical side walls 18, a vertical front wall 19 of equal height, and a short vertical rear wall 20. All of the walls 18, 19 and 20 are joined rigidly together along their edges and may be formed of a single sheet of metal. A horizontal top member 21 joins the front wall 19 and the side walls 18, extending approximately to the center of the latter so as to form a closed rectangular front portion. In the front wall 19 is an upper viewing screen 30 and beneath it is a lens 31 as will hereinafter be described. Both the screen 30 and the lens 31 are in the view of the subject 11, and the axis of lens 31 is aligned with the face of the subject.

The upper rear corner of the housing 10 is removed, and an angularly disposed rear wall 22 extends upwardly and forwardly from the vertical rear wall 20 to join with the side walls 18 and with a short vertical overhang 23, dropped downwardly from the top member 21. Thus, the housing 10 is a completely closed structure which is light-proof and of simple and rugged construction. The angled wall 22 supports a test screen 32 similar to the viewing screen 30 for the purpose of checking the alignment and focus of the apparatus, and to allow the operator a private opportunity to test various coiffures 13 and select those appropriate and possible. As may be understood, not every coiffure can be fashioned with the hair of a particular woman. Therefore, it is advantageous that the operator be given first selection so that he may select those coiffures both proper and possible.

Above the screen 32 is an angular hood 33 as is shown in the preferred form. The hood 33 is of generally inverted U-shape, having its upper wall fastened to the top member 21 and its side walls fastened to the side walls 18 in a light-proof joint. The rear of the hood 33 is open so that the operator may view the screen 32, and as is apparent, the intensity of the image of the screen 32 will be increased by the elimination of the ambient room lighting. If desired, the hood 33 may be formed as an integral part of the housing 10, being merely an extension of the side walls 18 and top 21.

Considering the optical or image-forming system of the apparatus, it will be remembered that the lens 31 is positioned on the front wall 19 so as to be in alignment with and perpendicular to the face of the subject 11. The lens 31 is a positive or converging lens of conventional design and is recessed slightly behind the wall 19 by an annular supporting ring 35 which is removably fastened to the wall 19. A circular aperture 36 is cut in the wall 19 in front of the lens 31, and light rays from the subject 11, shown diagrammatically in Figure 2, pass through the lens and are converged inwardly.

Directly behind the lens 31 is a deflecting means, such as surface reflecting plane mirror 37 which is pivotally mounted about a horizontal axis at 38, perpendicular to the axis of the lens 31. The mirror 37 is movable from a horizontal position, shown in dotted outline in Figure 2, to a position wherein the plane of the mirror is positioned at 45° with respect to the horizontal. To allow such movement of the mirror 37, a simple form of construction is used in the illustrated apparatus. A dowel or rod is slotted and fastened to the lower edge of the mirror 37 and lies along the horizontal axis 38. The ends of the dowel 38 are journaled in the side walls 18 and the mirror 37 is thus rotatably held.

On the upper edge of the mirror 37 is a similar dowel 39 which extends outwardly to pass through the side walls 18. In the side walls 18 are arcuate grooves 40 in which the dowel 39 is free to travel, but is restrained slightly by frictional engagement therewith. The grooves 40 cover an arc of 45° and thus allow the mirror to be positioned in its two previously mentioned positions. The outer ends of the dowel 39 extend beyond the side walls 18 and serve as handles to control the movement of the mirror 37. When the mirror 37 is moved to its upper position, as is shown in Figures 1 and 2, the frictional engagement of the dowel 39 with the grooves 40 holds the mirror firmly in position.

As is apparent, when the mirror 37 is lowered to its horizontal position, the light rays entering the lens 31 do not strike the mirror but continue rearwardly. Near the back of the housing 10 is a second deflecting means, such as a reflecting mirror 41 which directs the light rays upwardly onto the screen 32. The mirror 41 is a plane surface which is held perpendicular to the axis of the lens 31 at an angle of 30° with the horizontal. Supporting the mirror 41 is a vertical bracket 42 which is rigidly fastened to the mirror at its upper end, and is slidably secured to the housing base 16 at its lower end. The base 16 is longitudinally slotted at 43 and extending downwardly through the slot is a threaded extension of the bracket 42 which engages a clamping nut 44. Longitudinal movement of the mirror 41 increases or decreases the distance traveled by the light rays in reaching the screen 32, and in operation the mirror is moved along the slot 43 until a proper focus is obtained on the screen 32. The clamping nut 44 is then tightened to hold the mirror 41 in position.

The screen 32 is a plain translucent sheet held in place on the wall 22, and is a diffusion screen such as ground glass or other types well-known in the art. As with the mirror 41, the screen 32 makes an angle of 30° with respect to the horizontal, but its slope is reversed and the screen extends upwardly and forwardly while the mirror extends upwardly and rearwardly. Because of the angular relationship between the screen 32 and mirror 41, the path of all light rays leaving the lens 31 and reflecting from the mirror to the screen is equal to the path that would be traveled by the rays should they be brought to focus on a vertical screen held in the rear of the housing, as is indicated in phantom lines 12b. The inverted rays striking the mirror 41 are reinverted upon their upward reflection and an image 12a formed on the screen 32 is a real image in an upright position.

When the mirror 37 is moved upwardly to its alternate position at an angle of 45° with the horizontal, light rays entering the lens 31 are reflected upwardly. A third surface reflecting mirror 50 is held in the top of the housing by a vertical bracket 51 depending from the top member 21. The mirror 50 makes an angle of 45° with the horizontal, and has the reverse slope of the mirror 37, extending upwardly and forwardly while the latter extends upwardly and rearwardly. The two mirrors 37 and 50 therefore reinvert the light rays and direct them forwardly on the screen 30 positioned vertically in the front wall 19. The bracket 51 supporting the mirror 50 is similar to the bracket 42, and has an upward projection which extends through a longitudinal slot 52 in the top 21 to engage a clamping nut 53. Longitudinal movement of the bracket 51 changes the length of the path traveled by the light rays reflected upwardly from the mirror 37, and thus enables the operator to bring the image 12 into sharp focus on the screen 30. The screen 30 is similar to the screen 31, being preferably a ground glass plate, and the image 12 which is formed thereon is a real image visible to the subject 11.

Figure 5:
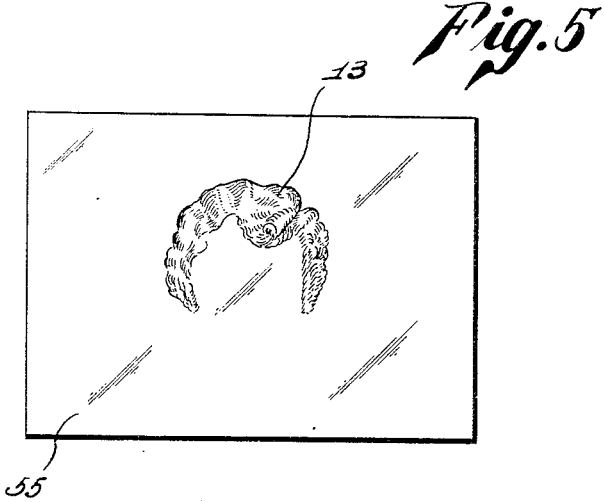
Figure 5 is a front elevation of a slide having a coiffure reproduced thereon.

The operation of the apparatus will now be briefly considered. In Figure 5 is seen a transparent plate 55 of glass or other suitable material rectangularly shaped and considerably smaller than the size of the screen 30 and 32. On the back of the plate 55 is the artistically created coiffure 13, scaled to the size of the image 12 and being preferably formed by line painting or other suitable method so as to be somewhat transparent. The natural highlights are thus reproduced and the appearance of the coiffure 13 is very lifelike. It is, of course, understood that there are a great variety of plates 55 supplied for use with the apparatus, and each has thereon an artistic reproduction of a coiffure 13. It has been found by tests that the facial width of most subjects is approximately the same, and consequently the coiffures 13 simulate quite closely the appearance of an actual coiffure. Furthermore, the coiffures 13 can be graduated in sizes and shapes if this is found desirable, and those corresponding to the facial dimensions of the particular subject 11 are then used.

After seating the subject 11 and securing the net 14 around her head, the operator adjusts the illumination on the face of the subject by conventional means such as spotlight (not shown), and then moves to the rear of the housing 10. He lowers the mirror 37 to the horizontal position and views the image 12a on the screen 32, adjusting for proper focus by the knob 44. Selecting from a file of plates 55, he selects those coiffures 13 which are possible choices, and superimposes the plates 55 on the screen 32, bringing the hair line of the coiffure 13 in corresponding alignment with facial outline of the image 12a. After selecting the most appropriate coiffure 13, the operator raises the mirror 37 to its upper position and the image 12 is thrown on the screen 30. At this point, it should be noted that the image 12 and the image 12a are identical in size. The position of the mirrors 37, 41 and 50, and screens 30 and 32 is such that the light rays entering the lens 31 travel equal distances in reaching either of the screens. Having therefore selected the plates 55 which are proper, the operator now takes the selected plates 55 to the front screen 30 where he superimposes them on the image 12. Should it be necessary to focus, he controls the movement of the mirror 50 by the knob 53. As is best seen in Figure 1, the combined images 12 and 13 viewed by the subject 11 is a pictorial representation of her appearance after the creation of the particular coiffure. By the use of my method and apparatus, it can therefore be understood that satisfaction is obtained in the selection of coiffures without the necessity of any wasteful or expensive testing. Furthermore, it can be understood that the procedure as described may be used for pre-selection of millinery or other fashions with only minor modifications.

Figure 4:
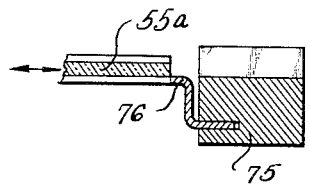
Figure 4 is a partial cross-section of a slide frame taken along the line 4—4 of Figure 3.

In Figures 3 and 4, I have shown a modified form of my apparatus in which a photograph is produced in place of a transitory image. This apparatus may be especially desirable under some conditions, as for example, when the subject 11 wishes to consult with friends or relatives before authorizing the work. The apparatus is generally similar to the preferred form previously described, with the addition of certain camera elements and the elimination of the forward viewing mirror. A housing 10a, comprises a base 16a, a forward wall 19a, side walls 18a, rear wall 20a, top member 21a, and angled wall 22a. The housing 10a is supported on a pedestal 17a and may be aligned with a subject illustrated diagrammatically as 11a.

Recessed in the front wall is a lens 31a and directly behind the lens is a shutter mechanism indicated at 60. A flash bulb 61 is positioned on the front wall 19a above the lens 31a and cooperates with the shutter 60 through a suitable timing mechanism to illuminate the subject 11a. On the angled wall 22a is a diffusion screen 32a positioned at an angle of 30° with the horizontal, and directly below it is a surface reflecting plane mirror 62 which is pivotally mounted on a rod 63 along its lower edge. On the upper edge of the mirror 62 is a similar rod 64 which travels in grooves 65 cut in the side walls 18a and extends therethrough to serve as handles. When the mirror 62 is lowered to the horizontal position, light rays entering the lens 31a pass rearwardly over the mirror, and when the latter is raised to an angle of 30° with the horizontal, light rays are reflected upwardly on the screen 32a to form a real image 12c.

The rear wall 20a of the housing 10a has a large opening formed therein, and fastened adjacent the wall is a framework or track 70 having two sets of parallel vertical grooves 71 and 72 therein. The rear surface of the framework 70 is covered, and the rear set of grooves 72 is adapted to receive a photographic plate or film 73 in a conventional manner. In conjuction with the lens 31a, and the shutter 60, the plate 73 records a photographic image 12d of the subject 11a. The forward set of vertical grooves 71 is adapted to receive an outer slide frame 75, as is seen best in Figure 4, which contains an inner frame 76 holding a transparent plate 55a similar to the plate 55. The inner frame 76 is slidably mounted in the frame 75 to move vertically, and the plate 55 is adapted to move horizontally within the frame 76. Thus, as can be seen, the plate 55a may be positioned any place within the outer framework 75, and in the form shown will be held in place by frictional engagement between the respective frameworks.

Considering the operation of the apparatus, it will be seen that if the shutter 60 is opened, and the mirror 62 is raised, the real image 12c will be formed on the screen 32a. The operator then selects and tests various plates 55a until he finds several which he considers proper. Each plate 55a is, of course, mounted in a framework 75 and is properly aligned with the image 12c by movement of the plate and the inner frame 76 in their perpendicular track.

The operator then closes the shutter 60 and sets it for the proper time of exposure, connecting the flash bulb 61 for operation therewith. The photographic plate 73 is inserted in the grooves 72 and the properly aligned frame 75 is inserted in the grooves 71. After the mirror 62 is lowered, the operator exposes the plate 73 through the shutter 60. The resulting image 12d is thus modified by the addition of the coiffure pictorially represented on the plate 55a. As may be understood, the operation is repeated several times until several plates 73 are exposed. When these plates are developed and printed, the subject has a permanent record to examine.

If desired, the modified apparatus shown in Figure 3 may be combined with the preferred apparatus in a single instrument. These and other changes in design and construction will be apparent to those skilled in the art, and I wish it to be understood that I do not restrict myself to the detailed construction herein shown, except as defined in the appended claims.

I claim:

1. An apparatus for previewing the appearance of various coiffures on a particular person, which includes: a housing; a diffusion screen mounted in said housing and visible to said person; a positive lens mounted in said housing for producing a real optical image of the head of said person; reflectors mounted in said housing to direct the image rays and produce an erect optical image on said screen; and a plurality of transparent plates having images of said coiffures thereon scaled to said real optical image, said plates being formed to be superimposed on said screen and of a size less than said screen for vertical and horizontal adjustment to bring said coiffure image in register with the facial outline of said optical image.

2. An apparatus for previewing the appearance of various coiffures on a particular person which includes: a housing; a positive lens mounted in the front of said housing and in optical alignment with the head of said person to produce a real optical image therof; a first viewing screen mounted in the rear of said housing; a first reflecting means mounted in the rear of said housing to direct the image rays to said first viewing screen and produce a first erect optical image thereon; a second viewing screen mounted in the front of said housing, the same focal distance from said lens as said first screen and visible to said person; a second reflecting means mounted in the front of said housing to direct the image rays to said second viewing screen and produce an erect optical image identical with said first image thereon; and a plurality of transparent plates having images of said coiffures thereon scaled to said real optical images, said plates being formed to be superimposed on either of said screens and of a size less than said screens for vertical and horizontal adjustment to bring said coiffure images in register with the facial outline of said optical image.

3. An apparatus for previewing the appearance of various coiffures on a particular person, which includes: a housing; a positive lens mounted in front of said housing and in optical alignment with the head of said person to produce a real optical image therof; a first viewing screen mounted in the rear of said housing; a first reflector mounted in the rear of said housing duce a real optical image thereof; a first viewing screen and produce an erect real optical image thereon; a second viewing screen mounted in the front of said housing and visible to said person; a second reflector in said housing behind said lens, and movable into and out of the path of said image rays; a third reflector cooperating with said second reflector to direct the image rays to said second viewing screen and produce said erect real optical image thereon, whereby a plurality of transparent plates having images of said coiffures thereon may be superimposed on either of said screens to produce a combined image of said person and said coiffure.

4. An apparatus for combining an optical image and a pictorial image which includes: a housing; a viewing screen mounted in the front of said housing; a positive lens mounted in the front of said housing to produce a real optical image; optical deflecting means to direct the optical rays onto said screen and produce an upright optical image; and a plurality of transparent slides having said pictorial images thereon, scaled to said optical image and formed to be superimposed on said screen to register with said optical image and produce a combined image.

5. An apparatus for combining an optical image and a pictorial image which includes: a housing; a viewing screen mounted in said housing; a positive lens mounted in the front of said housing to produce a real optical image; reflecting means to direct the image rays onto said screen and produce an upright optical image; film holding means in the rear of said housing on the optical axis of said lens and at the same focal distance from said lens as said screen, whereby the image formed on said film is the same size as said screen image; a plurality of framed slides having said pictorial images adjustably mounted therein and formed to be superimposed on said screen and brought into register with said screen image to create a combined image; and guide means adjacent said film holding means to receive said adjusted slides and superimpose said pictorial image on said film, whereby when said film is expoesd a combined optical and pictorial image is produced.

6. An apparatus for combining an optical image and a pictorial image which includes: a housing; a first diffusion screen mounted in the rear of said housing; a positive lens mounted in the front of said housing to produce a real optical image; a reflector to direct the image rays onto said first screen and produce an erect optical image; a second diffusion screen mounted in the front of said housing and at the same focal distance as said first screen; movable reflecting means mounted in said housing and movable into the path of said image rays to direct same onto said second diffusion screen and produce an erect optical image equal in size to the image formed on said first screen; and a plurality of transparent plates having said pictorial images thereon scaled to said real optical images, said plates being smaller than said screens and adapted to the superimposed thereon and adjusted to bring said image in corresponding alignment with the said optical image.

7. An apparatus for combining an optical image and a pictorial image which includes: a generally rectangular light-proof housing; a first diffusion screen mounted in the rear of said housing and sloping upwardly and forwardly; a second diffusion screen mounted perpendicularly in the front of said housing; a positive lens mounted in the front of said housing to produce a real optical image, the axis of said lens being in vertical alignment with said screens; a first reflecting surface in the rear of said housing on said lens axis and angularly disposed there to direct the image rays onto said first screen and produce an erect optical image; a second reflecting surface horizontally pivoted in said housing behind said lens movable into the path of said image rays to deflect same perpendicularly; a third reflecting surface in said housing behind said second diffusion screen to cooperate with said second surface and direct said image rays onto said second screen to produce an erect optical image equal in size to the image formed on said first screen; and a plurality of transparent slides having said pictorial images thereon scaled to said optical images, said plates being smaller than said screens and adapted to be superimposed thereon and adjusted to register said optical images and said pictorial images.

8. An apparatus for previewing the appearance of various coiffures on a particular person which includes: a housing; a diffusion screen mounted in said housing and visible to said person; a positive lens mounted in said housing for producing a real optical image of the head of said person; reflectors mounted in said housing to direct the image rays and produce an erect optical image on said screen; adjustment means for bringing said optical image into sharp focus on said screen; and a plurality of transparent plates having images of said coiffures thereon scaled to said real optical image, said plates being formed to be superimposed on said screen and of a size less than said screen for vertical and horizontal adjustment to bring said coiffure image in register with the facial outline of said optical image.

9. An apparatus for combining an optical image and a pictorial image which includes: a housing, a viewing screen mounted in said housing; a positive lens mounted in the front of said housing to produce a real optical image; reflecting means to direct the image rays onto said screen and produce an upright optical image; adjustment means for bringing said image into sharp focus on said screen; film holding means in the rear of said housing on the optical axis of said lens and at the same focal distance from said lens as said screen, whereby the image formed on said film is the same size as said screen image; a plurality of framed slides having said pictorial images adjustably mounted therein and formed to be superimposed on said screen and brought into register with said screen image to create a combined image; and guide means adjacent said film holding means to receive said adjusted slides and superimpose said pictorial image on said film, whereby when said film is exposed a combined optical and pictorial image is produced.

ARTHUR D. SCOTT.

REFERENCES CITED

The following references are of record in the file of this patent:

UNITED STATES PATENTS

| Number | Name | Date |
| --- | --- | --- |
| 1,994,543 | Stenz et al. | Mar. 19, 1935 |
| 2,015,665 | Eitzen | Oct. 1, 1935 |
| 2,061,378 | Henze et al. | Nov. 17, 1936 |
| 2,075,198 | Henze et al. | Mar. 30, 1937 |
| 2,105,557 | Slack | Jan. 18, 1938 |